Figure 1:
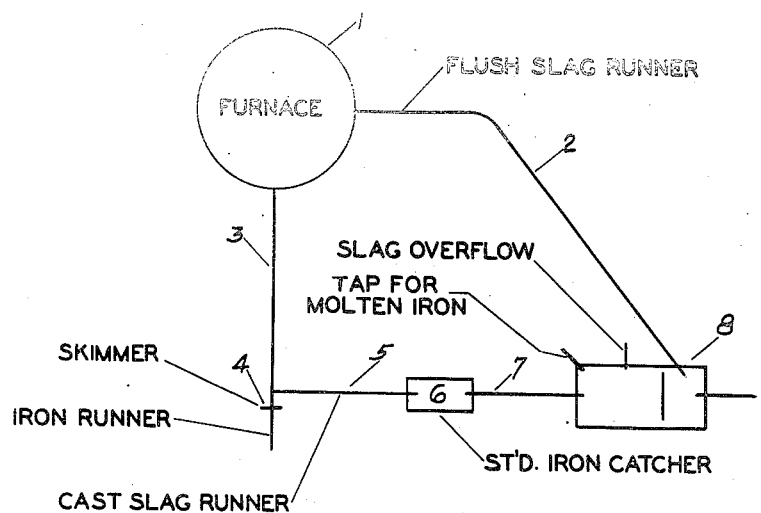

Oct. 8, 1957     S. P. KINNEY ET AL     2,809,028

IRON RETENTION AND SLAG REGULATING PIT

Filed Feb. 28, 1955

INVENTORS.
Selwyne P. Kinney.
BY & Fred Osborne.
Christy, Parmelee and Strickland
ATTORNEYS.

United States Patent Office 2,809,028
Patented Oct. 8, 1957

2,809,028

IRON RETENTION AND SLAG REGULATING PIT

Selwyne P. Kinney, Crafton, Pa., and Fred Osborne, Birmingham, Ala.

Application February 28, 1955, Serial No. 491,092

4 Claims. (Cl. 266—37)

This invention is concerned generally with apparatus for the cellulation of blast furnace slag to produce a hard, strong light-weight aggregate for use as fill, as a substitute for gravel in concrete construction and other similar uses. More specifically the invention pertains to a novel form of iron retention and slag flow regulating pit for feeding the molten slag to the cellulating apparatus.

This invention is an improvement on the slag feed control to the cellulating apparatus disclosed and described in detail in the copending application of Fred Osborne, Serial No. 255,029, now Patent No. 2,702,407, dated February 22, 1955, and reference is made thereto for all details of construction and practice of the method and apparatus for cellulating slag herein referred to.

In the typical construction and operation of blast furnaces for the manufacture of cast iron and other types of metallurgical blast furnaces, it is customary to charge the ore, limestone, coke and other elements into the upper portion of the furnace and as the reduction process proceeds, the molten metal and slag are collected at the lower portion of the furnace. This latter portion of the furnace is provided with means for withdrawing the slag and the molten metal from the furnace, and such means are customarily referred to in the art as "runners." In a typical blast furnace construction one or more runners referred to as "flush slag runners" are located at one elevation in the bottom portion of the furnace for withdrawing the slag disposed above the molten metal, and other runners generally referred to as the "iron runners" are located at a lower elevation for withdrawing the molten metal which often has some slag floating thereon. It is customary to locate a device called a "skimmer" on the iron runner in spaced relation to the blast furnace for separating the slag floating on the molten metal and diverting it to the slag pits into which are also discharged the contents of the flush slag runners. Since the slag diverted from the iron runner may have some metal mixed therewith, it is desirable to separate this slag-contaminated metal from the slag before discharging it from the slag pit to the cellulating apparatus.

In the aforesaid Fred Osborne application disclosing method and apparatus for cellulating blast furnace slag, there is disclosed a runner which receives the molten blast furnace slag and conveys it to the cellulating apparatus. It is desirable in the operation of the Osborne slag cellulating apparatus that the slag be fed thereto at a uniform volume, and for this purpose it has been customary to dispose a regulating chamber between the furnace and the cellulating apparatus, the slag being fed from the blast furnace into the top of the regulating chamber, and being withdrawn from the bottom thereof for feeding to the cellulating apparatus. It is very desirable in the operation of the Osborne cellulating process that the slag to be cellulated be entirely free of the molten metal or iron since any hot metal passing into the cellulating chamber and exposed to water therein would be apt to explode upon contact with the water with consequent damage to the apparatus and possible injury to nearby workmen. The slag after cellulation by the Osborne process is of much greater value than before cellulation, therefore it is desirable to use as much of the iron-contaminated slag as possible by separating therefrom the entrapped iron. The iron is also of great value, and it has been customary in the past to pass such iron-contaminated slag through what is known as an "iron retention pit" wherein the slag-contaminated iron was charged into the top of the pit, so that the iron fell by gravity to the bottom of the pit where it was withdrawn, and the slag, being lighter, was withdrawn from the pit by a suitable runner disposed intermediate the upper and lower levels of the pit.

In the present invention it is proposed to combine the iron retention pit with the slag flow-regulating chamber of the Osborne process into a single pit of suitable size, and to divide the pit into two chambers by suitable means such as a partition or dam, one of said chambers being relatively small to serve as the slag flow-regulating chamber into which is directly discharged the contents of the flush slag runner, and the other chamber being relatively large into which is discharged the contents of the cast slag runner containing the iron-contaminated slag. In this latter chamber the iron would settle to the bottom thereof by gravity and be withdrawn. The iron-free slag in such chamber would flow over the dam into the slag flow-regulating chamber to mix with the flush slag therein.

Figure 2:
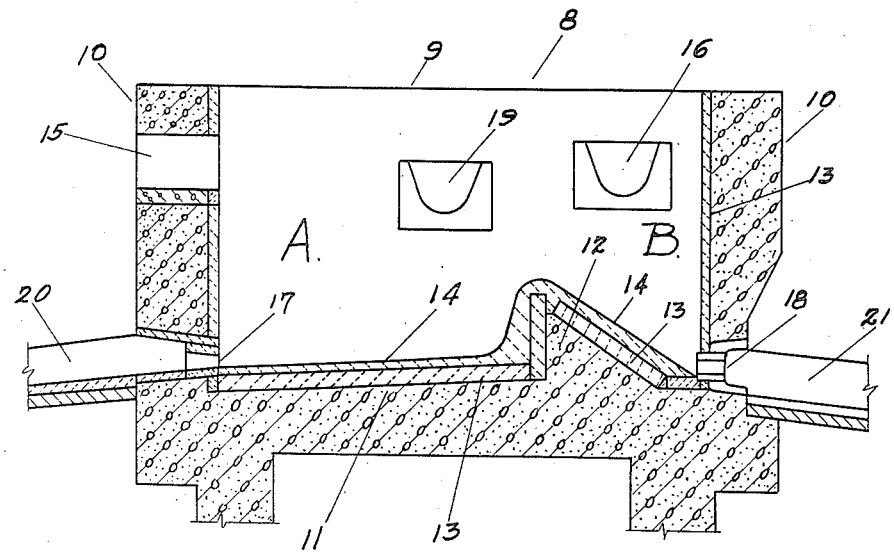

In the drawings forming part of this disclosure:

Fig. 1 shows a schematic arrangement of the blast furnace with the flush cast slag runner and combined iron retention and slag control pit; and Fig. 2 shows a cross section through the pit taken on the line II—II of Fig. 1.

Referring now in detail to the drawings, reference character 1 indicates a furnace from which extends a flush slag runner 2 and an iron runner 3, having the conventional skimmer 4 associated therewith for diverting the slag from the iron runner into a cast slag runner 5 discharging into a conventional iron retention pit 6. Most of the iron falls to the bottom of the pit 6 and is discharged through a suitable opening adjacent the bottom of the pit, and the slag with some iron still entrapped therein flows through the runner 7 into the combined iron-trapping and slag-regulating flow pit 8 which also receives the slag from the flush slag runner 2.

The pit 8 as shown in Fig. 2 of the drawings is of a suitable size to handle the slag discharge from one or more furnaces 1 as desired. The side walls 9 and end walls 10 of the pit 8 may be of any suitable material such as concrete, and the bottom 11 may be formed of the same or other suitable materials. At the bottom of the pit between the side walls 9 is a suitable dam or partition 12 extending upwardly from the bottom 11 dividing the pit into chambers A and B, the chamber A comprising the iron retention part of the chamber of the pit, and the chamber B comprising the slag flow control portion of the pit. The side and end walls, bottom and partition of the pit are preferably lined with a suitable heat-resistant material such as firebrick 13. Within the chamber A and extending through the end wall 10 thereof adjacent the top of the chamber is a suitable opening 15 through which is discharged the contents of the cast slag runner 7 and any iron mixed therewith. Within either the chamber B or chamber A and extending through the adjacent pit side wall 9 is another suitable opening 16 through which is fed the flush slag from the runner 2 for the cellulating apparatus. The firebrick at the bottom of the pit and at the exposed surfaces of the dam 12 are preferably provided with a lining 14 of fire clay disposed over the firebrick. Such a lining is readily renewable and protects the firebrick. It is preferable to mix the clay with, or dispose on the clay, a layer of coke breeze. It is to be understood that any other suitable readily renewable insulating material may be used over the firebrick. As shown in Fig. 2 of the drawings, the bottom portion of the chamber A slopes downwardly from the dam 12 towards an iron outlet 17. The bottom portion of the chamber B slopes downwardly and outwardly from the dam 12 towards its outlet 18. A slag overflow opening 19 disposed in a side wall, such as 9, below the level of the openings 15 and 16 is disposed between the chambers A and B adjacent the dam 12. The bottom openings 17 and 18 of the pit chambers A and B respectively have associated therewith the conventional devices known as "monkeys" for controlling the flow of the metal or slag from these chambers. A runner 20 connects opening 17 in chamber A with a pit to receive the entrapped iron and a runner 21 connects opening 18 in chamber B with the cellulating apparatus.

In operation, the cast slag runner feeds the molten slag and entrapped iron into chamber A through opening 15. The iron being heaviest falls to the bottom of chamber A and is drawn off through opening 17. The molten slag floats on the iron in chamber A, and as the chamber fills the slag flows over dam 12 into chamber B. The iron free, or flush slag, may be discharged into pit chamber B and the contents of chamber B flows through opening 18 into runner 21 and to the cellulating apparatus.

The precise location of openings 15, 16 and 19 in the pit 8 is of no great importance so long as the overflow opening 19 is below the level of the openings 15 and 16, and above the level of top of dam 12. Thus both openings 15 and 16 may feed slag into chamber A and the iron free slag flowing over dam 12 will fill chamber B, or opening 15 may feed slag and iron to chamber A while opening 16 feeds iron free slag to chamber B. In every instance, however, the slag having iron therein must be discharged into chamber A behind dam 12 for entrapping the iron and separating it from any slag fed into chamber B.

It is to be understood that pit 8 may be made large enough to completely trap all iron from the slag so that the pit 6 may be unnecessary. Likewise the chamber B may have a plurality of openings 18 therein so as to feed iron free slag to a plurality of cellulating apparatuses. In those cases where no cellulation of slag is performed and the principal object is to recover as much iron as possible from the slag before disposing of it, the runner 21 may be directed to any desirable point of discharge of the slag.

The exact details of construction of the pit or receptacle 8 disclosed in the drawings are for purposes of illustration and not limitation, so that many modifications thereof will suggest themselves to those skilled in the art, which are within the scope of the appended claims.

We claim:
1. Apparatus for uniform feeding of iron free blast furnace slag to a slag processing mechanism comprising, a receptacle having side and end retaining walls and bottom wall having a heat resistant lining for receiving hot slag, a partition wall extending between opposite receptacle walls and extending upwardly a predetermined distance from the bottom wall to divide the receptacle into two chambers with the top of the partition wall below the tops of the receptacle side and end walls, a heat resistant lining applied to the opposite faces and top of the partition wall, a cast slag runner opening into a receptacle wall of one of said chambers above the level of the top of said partition wall, an outlet in said one chamber adjacent the bottom thereof, a flush slag runner opening into said receptacle above the level of the top of said partition wall, an outlet in said second of said chambers adjacent the bottom thereof discharging hot slag to the slag processing mechanism an overflow runner opening into a wall of the receptacle above the level of the top of the partition wall and below the level of the inlet openings to the receptacle for flush and cast slag.

2. The receptacle as in claim 1, wherein the opening adjacent the bottom of each chamber has means mounted therein for controlling flow of the contents through said openings.

3. The receptacle as in claim 1 wherein the bottom wall slopes away from said partition wall and towards the chamber openings of the receptacle.

4. Apparatus for segregating entrapped iron from molten blast furnace slag comprising a receptacle having side, end and bottom walls, a fire resistant lining applied to said walls to be contacted by the molten slag, a partition disposed upon the bottom wall and extending upwardly therefrom connecting opposite walls of the receptacle to divide the receptacle into two chambers with the dividing wall therebetween terminating a substantial distance below the tops of said receptacle side walls, means for discharging mixed molten iron and slag into one of said two chambers, said dividing wall serving to prevent iron sinking to the bottom of the chamber from passing into the adjacent chamber while permitting iron free slag to flow over top of the wall, an opening in said iron receiving chamber for withdrawing molten iron therefrom adjacent the bottom thereof, and an opening in the other of said chambers below the level of the dividing wall for discharging iron free slag from said chamber.

References Cited in the file of this patent

UNITED STATES PATENTS

| | | |
|---|---|---|
| 515,081 | Iles | Feb. 20, 1894 |
| 1,590,730 | Evans | June 29, 1926 |
| 1,820,597 | Colwell | Aug. 25, 1931 |
| 2,426,607 | Gronningsater | Sept. 2, 1947 |
| 2,552,648 | Poland | May 15, 1951 |
| 2,659,120 | Harter et al. | Nov. 17, 1953 |

FOREIGN PATENTS

| | | |
|---|---|---|
| 226,700 | Great Britain | Jan. 1, 1925 |